United States Patent
Yang

(10) Patent No.: US 9,119,245 B1
(45) Date of Patent: Aug. 25, 2015

(54) LED DRIVING SYSTEM FOR SWITCHED DIMMING CONTROL AND DIMMING METHOD USING THE SAME

(71) Applicant: Chin-Hsin Yang, Taipei (TW)

(72) Inventor: Chin-Hsin Yang, Taipei (TW)

( * ) Notice: Subject to any disclaimer, the term of this patent is extended or adjusted under 35 U.S.C. 154(b) by 0 days.

(21) Appl. No.: 14/492,795

(22) Filed: Sep. 22, 2014

(30) Foreign Application Priority Data

Apr. 29, 2014 (CN) .......................... 2014 1 0176172

(51) Int. Cl.
 *H05B 33/08* (2006.01)
 *H05B 37/02* (2006.01)
(52) U.S. Cl.
 CPC ........ *H05B 37/0281* (2013.01); *H05B 33/0851* (2013.01)
(58) Field of Classification Search
 USPC .................. 315/201, 291, 294, 297, 308, 307
 See application file for complete search history.

(56) References Cited

U.S. PATENT DOCUMENTS

2009/0273288 A1* 11/2009 Zhao et al. ................ 315/185 R
2010/0134040 A1* 6/2010 Elder ............................ 315/294

FOREIGN PATENT DOCUMENTS

TW 201021622 A 11/2008

OTHER PUBLICATIONS

Taiwanese Office Action dated Mar. 23, 2005 issued in corresponding Taiwanese application No. 103115673.

* cited by examiner

*Primary Examiner* — Douglas W Owens
*Assistant Examiner* — Jonathan Cooper
(74) *Attorney, Agent, or Firm* — Bacon & Thomas, PLLC

(57) ABSTRACT

A light emitting diode driving system with precise timing switched dimming control used for driving light emitting diode elements is provided, which comprises a power detection unit, a timer control logic, a light emitting diode dimming driver, and a power supply unit being able to overcome different conditions of power source, switch leakage, and system elements to design the timer dimming with steady and precise working status, and solve problems of each of the independent systems which are not synchronized due to imprecisely timed under power-off condition, while providing various dimming mode for users, and a dimming method using aforementioned LED driving system.

8 Claims, 3 Drawing Sheets

LED DRIVING SYSTEM FOR SWITCHED DIMMING CONTROL AND DIMMING METHOD USING THE SAME

CROSS-REFERENCE TO RELATED APPLICATION

This application claims the benefit of China Patent Application No. 201410176172.4, filed on Apr. 29, 2014, in the State Intellectual Property Office, the disclosure of which is incorporated herein its entirety by reference.

BACKGROUND OF THE INVENTION

1. Field of the Invention

The present invention relates to a light emitting diode driving system, in particular with respect to a light emitting diode (LED) driving system with precise timing control dimming control used for driving light emitting diode elements and dimming method using the same.

2. Description of the Related Art

Because the energy crisis becomes more and more severe, LED, which is regarded as a high efficiency light source, has caused high attention. For example, white light LED has not only been commonly applied to backlight sources of consumer electronics, such as cell phone, PDA, LCD TV and so on, but also widely-used in public signal marks, industrial communication lighting system, car lamps, and fields of enormous normal industrial and civil lighting systems.

In addition, comparing with fluorescent lamp, energy saving lamp, high-pressure sodium lamp, dimming can be carried out easily in terms of LED light source; consequently, dimming function shall be added to various LED lamps. From smaller lighting equipment, such as light bulb to large one, LED's power source has to drive widespread diverse applications; additionally, the power source thereof still needs to support the Triac dimming which the traditional illumination lamps use, PWM dimming used by LED lighting and linear dimming by turning knob's variable resistance and so on and so forth.

Generally, the current LED switched dimming utilizes natural electrical discharge of capacitor to maintain the dimming status, and power source switcher is in off condition, it needs to use capacitor to supply power to flip-flop so as to maintain brightness count value; even though different voltage thresholds may be added to indicate the power source's condition, according to diverse situations of power source, switch leakage and elements of system, it may cause unstable operating status and imprecise timing dimming. As a result, it is a desire to accomplish a LED driving system with precise switched step dimming.

SUMMARY OF THE INVENTION

In view of the aforementioned existing technical problems, one purpose of the present invention is to provide a light emitting diode driving system with precise timing switched dimming control used for driving light emitting diode elements and dimming method using the same.

According to an aspect of the present invention, it may provide a LED driving system with precise timing switched dimming control used for driving light emitting diode elements, including: a power detection unit electrically connected to a rectification unit, the rectification unit receiving an AC voltage and rectifying that as a DC voltage, the power detection unit detecting a voltage frequency of the DC voltage and the AC voltage supplied to a light emitting diode driving circuit; a timer control logic comprising an oscillator having a body oscillation frequency, a volatility memory module and a recovery register; the volatility memory module storing recorded dimming data and a plurality of dimming setting values, the timer control logic obtaining a count value by sampling the voltage frequency of power source with the body oscillation frequency and storing the count value into the recovery register, the timer control logic serving as an oscillation number of the body oscillation frequency by the count value stored in the recovery register after the power source being cut for recovering the voltage frequency and serving as a reference period; wherein the reference period provides the timer control logic serving as a calculation standard of a predetermined time and a timing after the power source is cut, the timer control logic selects one of the plurality of dimming setting values according to the timing and the predetermined time to output a control signal corresponding to the dimming setting value; a light emitting diode dimming driver electrically connected to the power detection unit, the light emitting diode driving circuit and the timer control logic, respectively; the light emitting diode driving circuit receiving the DC voltage of the rectification unit and electrically connected to the light emitting diode elements and output the control signal according to the timer control logic to drive the light emitting diode to emit light, and detecting a feedback signal in the light emitting diode driving circuit to control an output current of the light emitting diode driving circuit so as to control the dimming; and a power supply unit electrically connected to the light emitting diode dimming driver, the power supply unit connected to a power maintenance capacitor through a switch unit, and the power maintenance capacitor supplying desired power voltage to the timer control logic and the power detection unit in the light emitting diode driving system in power-off condition and comprising at least an electric capacity maintaining the light emitting diode driving system operated by the predetermined time.

Preferably, the body oscillation frequency may be improved by Laser trimming, and the light emitting driving system take the body oscillation frequency as a main frequency of switching power for dimming control.

Preferably, the timer control logic may include a micro control unit, and the micro control unit at least maintaining operation by the predetermined time by the power maintenance capacitor in power-off condition.

Preferably, the timer control logic may drive the light emitting diode driving system by the frequency period of the rectified power source serving as the standard time of timer function in power-on condition.

Preferably, the light emitting diode dimming driver may control the emitting diode elements by a light emitting diode current having peak current control, average current method or zero cross control, and the light emitting diode dimming driver may further include a power factor correcting circuit for providing power factor correction of a digifax function to ensure the dimming module in stable operation so as to enhance efficiency of the whole circuit while driving the light emitting diode light emitting elements.

Preferably, the light emitting diode dimming driver may further conduct high color temperature brightness control according to the control signal output by the timer control logic and cooperate with fixed lower color temperature brightness so as to accomplish to control adjustment of color temperature.

According to another aspect of the present invention, it may provide a dimming method which is applicable to the light emitting diode driving system with precise timing switched dimming control used for driving emitting diode elements; it may include the following steps: turning on the power source; selecting a first dimming setting from the plurality of dimming settings; turning off the power source, the timer control logic starting to count time; turning on the power source, the timer control logic ending to count time and a first timing time being obtained; determining whether the first timing time is larger than the predetermined time; if yes, resetting as the first dimming setting, if not, selecting a second dimming setting from the plurality of dimming settings; turning off the power source, the timer control logic starting to count time; turning on the power source, the timer control logic ending to count time and a second timing time being obtained; determining whether the second timing time is larger than the predetermined time; if yes, resetting as the first dimming setting, if not, selecting a third dimming setting from the plurality of dimming settings; turning off the power source, the timer control logic starting to count time; turning on the power source, the timer control logic ending to count time and a third timing time being obtained; determining whether the third timing time is larger than the predetermined time; if yes, resetting as the first dimming setting, if not, selecting a fourth dimming setting from the plurality of dimming settings; and turning power source off and on within arbitrary time, resetting as the first dimming setting and repeating the preceding steps.

According to another aspect of the present invention, it may provide a dimming method applicable to the light emitting diode driving system with precise timing switched dimming control used for driving emitting diode elements; it may comprise the following steps: turning on the power source; selecting a first dimming setting from the plurality of dimming settings; turning off the power source, the timer control logic starting to count time; turning on the power source, the timer control logic ending to count time and a first timing time being obtained; determining whether the first timing time is larger than the predetermined time; if yes, resetting as the first dimming setting, if not, selecting a second dimming setting from the plurality of dimming settings; setting the second dimming setting as an initial, delaying a short time continuously and trimming by a third dimming setting to obtain a variable dimming setting; determining whether the variable dimming setting reaches to the first dimming setting; if yes, maintaining the variable dimming setting as the first dimming setting and stopping to trim; wherein, in the present step, if power source is turned off and is turned on after an interval time, the timer control logic counts the interval time to obtain a second timing time and determining whether the second timing time is larger than the predetermined time; if yes, resetting as the first dimming setting, if not, maintaining the variable dimming setting prior to power source being turned off; turning off the power source, the timer control logic starting to count time; turning on the power source, the timer control logic ending to count time and a third timing time being obtained; determining whether the first timing time is larger than the predetermined time; if yes, resetting as the first dimming setting, if not, selecting the second dimming setting from the plurality of dimming settings, and repeating and trimming the continuously delaying short time to obtain the steps of the variable dimming setting.

As the aforementioned description, the light emitting diode driving system with precise timing control dimming control used for driving light emitting diode elements and dimming method using the same disclosed in the present invention are applicable to design stable operating situation and precise timing dimming according to diverse states of different public power sources, switch leakage and system elements and to solve the problems concerning that it cannot conduct precise timing in power-off condition, resulting each independent system not be able to synchronize and provides various dimming modes for the user by a timer control logic simultaneously.

DETAILED DESCRIPTION OF THE PREFERRED EMBODIMENTS

Hereinafter, embodiments of the present invention will be described in detail with reference to the accompanying drawings so that those skilled in the art to which the present invention pertains can realize technique features, content, and effects to be accomplished of the present invention, and the drawings used herein are only intend to be schematically and assistant for the specification, but not the real scale and precise configuration. Therefore, as those skilled in the art should understand that the spirit or scope of the present invention shouldn't be interpreted and limited by the scale and configuration of the accompanying drawings.

Figure 1:
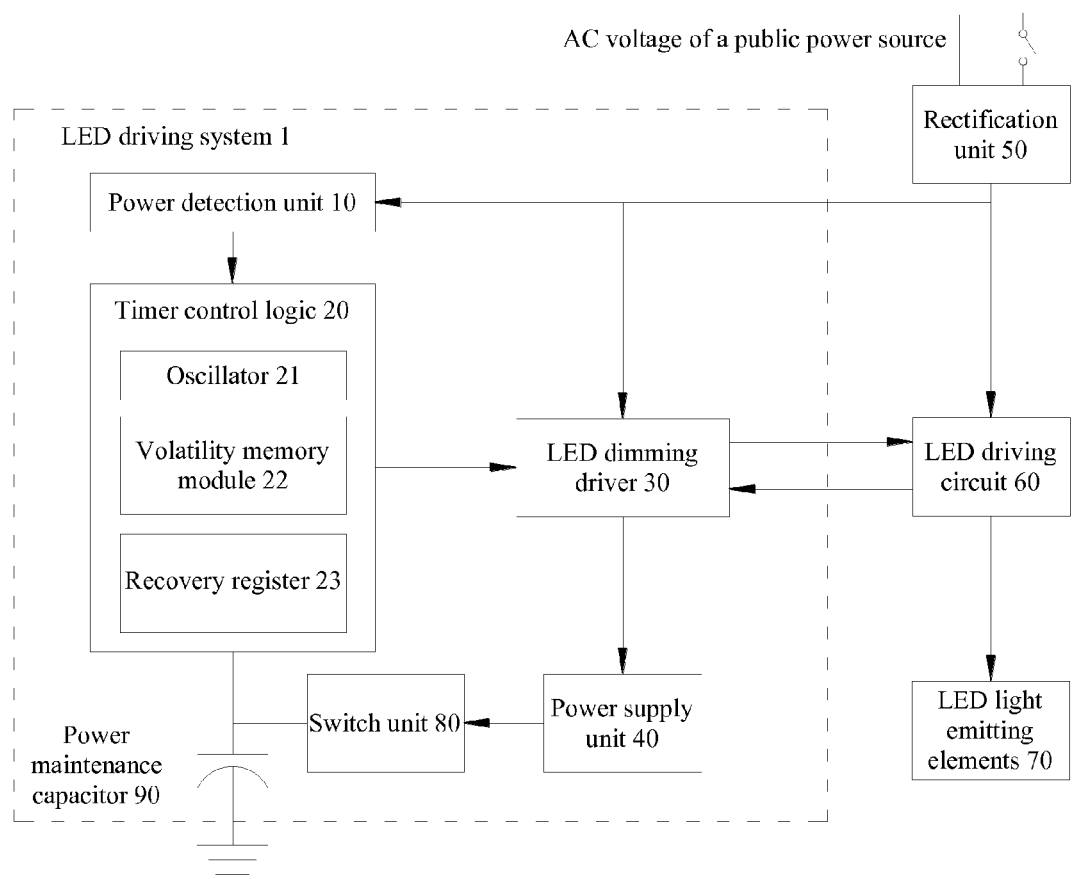
FIG. 1 is a schematic diagram of an embodiment of a light emitting diode driving system with precise timing switched dimming control of the present invention.

Please refer to FIG. 1, it is a schematic diagram of an embodiment of a light emitting diode driving system with precise timing switched dimming control of the present invention. As the figure shows, a LED driving system 1 with precise timing switched dimming control of the present invention may include a power detection unit 10, a timer control logic 20, a LED dimming driver 30 and a power supply unit 40. The power detection unit 10 may be electrically coupled to a rectification unit 50, the rectification unit may receive an AC voltage of a common power source controlled by a switcher; more specifically, an AC voltage of voltage range in 85 to 270V, but it shall not be limited in the range. The rectification unit 50 may rectify the AC voltage full wave rectification as a DC voltage to provide for the LED driving system 1 to use, here, power source detection unit 10 detects a voltage frequency of DC of a LED driving circuit 60 and AC voltage of the common power source, and may further includes turning power source on and off.

According to the preceding description, the timer control logic 20 may include an oscillator 21 having a body oscillation frequency, a volatility memory module 22 and a recovery register 23; the volatility memory module may store recorded dimming data and a plurality of dimming setting values corresponding to a plurality of dimming settings, respectively; the timer control logic may obtain a count value by sampling the voltage frequency, which is in range of 100 to 120 Hz, of power source rectified by the body oscillation frequency and the obtained count value may be stored in the recovery register. Here, the accuracy of the body oscillation frequency may have limitation, and may be changed according to the quality of the oscillator, and the used body oscillation frequency is of range 30 to 60 kHz; more specifically, the body oscillation frequency of 48 kHz is used to sample the common power source of 120 Hz through the voltage frequency detected by the power detection unit 10 in power-on condition and a count value of 400 may be obtained. According to the aforementioned description, in case the body oscillation frequency of another system drifts to 42 kHz, a count value of 350 may be obtained.

Subsequently, as frequency of the power source does not exist in power-off condition, the general methods of using frequency of the power source to conduct timing may not able to use. So, according to the embodiment of the present invention, it may use the timer control logic 20 to serve as an oscillation number of the body oscillation frequency by the count value stored in the recovery register 23 after the power source is off for recovering the voltage frequency and further to serve as a reference period; wherein the reference period provides the timer control logic serving as a calculation standard of a predetermined time and a timing after the power source is off. More specifically, it uses the counting value recorded by the recovery register 23 serving as the counting number of the body oscillation frequency 48 kHz, and when 48 kHz is counted by 400 times, the rectified power source of 120 Hz will be recovered precisely and served as the reference period. Wherein, the reference period provides the timer control logic 20 serving as a calculation standard of a predetermined time and a timing after the power source is cut, and the timer control logic may select one of the plurality of dimming setting values according to the timing and the predetermined time to output a control signal corresponding to the dimming setting value. For example, if the timing is 3 seconds, the period may be set as 360 times, and the timing by 3 seconds will be completed precisely to ensure synchronization of each independent system. As for as the current technic is concerned, the body oscillation frequency is of about 35 kHz to 55 kHz frequency range, and according to the embodiment of the present invention, in the manufacturing process, it may further improve the varied range of the body oscillation frequency by laser trimming in the chip probe (CP) process so as to correct as a more precise frequency.

In addition, the LED dimming driver 30 of the LED driving system with precise timing switched dimming control 1 may be electrically connected to the power detection unit 10, the LED driving circuit 60 and the timer control logic 20, respectively; the LED driving circuit 60 may receive the DC voltage of the rectification unit 50 and electrically connect to the LED light emitting elements 70, and output the control signal according to the timer control logic 20 to drive the LED light emitting elements 70 to emit light and detect a feedback signal in the LED driving circuit 60 to control output current of the LED driving circuit 60 to control the dimming. Here, in the LED dimming driver 30 it may use analog level or pulse width modulation (PWM) to control dimming, but it shall not subject to this restriction. The controlling procedure may be step dimming or linear dimming and so on. More specifically, the current control mentioned here may use peak current control, average current method or cross-zero current control and various isolated/non-isolated light emitting diode current to drive topology to control the LED light emitting elements, and a light emitting diode dimming driver 30 may further include a power factor correcting circuit for providing power factor correction (PFC) of a digifax function to ensure the dimming module in stable operation so as to enhance efficiency of the whole circuit while driving the LED light emitting elements.

Moreover, a power supply unit 40 of the LED driving system 1 with precise timing switched dimming control may be electrically connected to the LED dimming driver 30, the power supply unit 40 may be electrically connected to a power maintenance capacitor 90 through a switch unit 80, the switch unit 80 may be replaced by diode, the power maintenance capacitor 90 may provide desired power voltage to the timer control logic 20 and the power detection unit 10 in the light emitting diode driving system 1 when the power supply unit 40 is in power-off condition, and the power maintenance capacitor 90 may include an electric capacity maintaining the light emitting diode driving system 1 operated by the preceding predetermined time.

It is noteworthy that according to another embodiment of the LED driving system 1 with precise timing switched dimming control of the present invention may include design of conducting the timer control logic by micro control unit (MCU), wherein the frequency oscillator may use a quartz oscillator to accomplish an oscillator design of certain precision. Wherein, when the micro control unit is in power-off condition, it may still maintain the operation by the predetermined time by the power maintenance capacitor, and it may even obtain a precise reference time by the external quartz oscillator or internal oscillator in power-off condition. In the meanwhile, the precise timing method of the timer control logic 20 may also be used as timing function of the LED driving system with precise timing switched dimming control 1 in normal power supply condition.

Beside the aforementioned dimming functions, it may also use the arrangement of the power detection unit 10, the timer control logic 20, the LED dimming driver 30 and the power supply unit 40 of the LED driving system with precise timing switched dimming control 1 to conduct high color temperature brightness control switching dimming control, and cooperate with fixed low color temperature brightness of another unadjusted dimming to further accomplish controlling the brightness, color temperature and color rendering property of the LED light emitting elements 70 without sacrificing light source utility.

Figure 2:
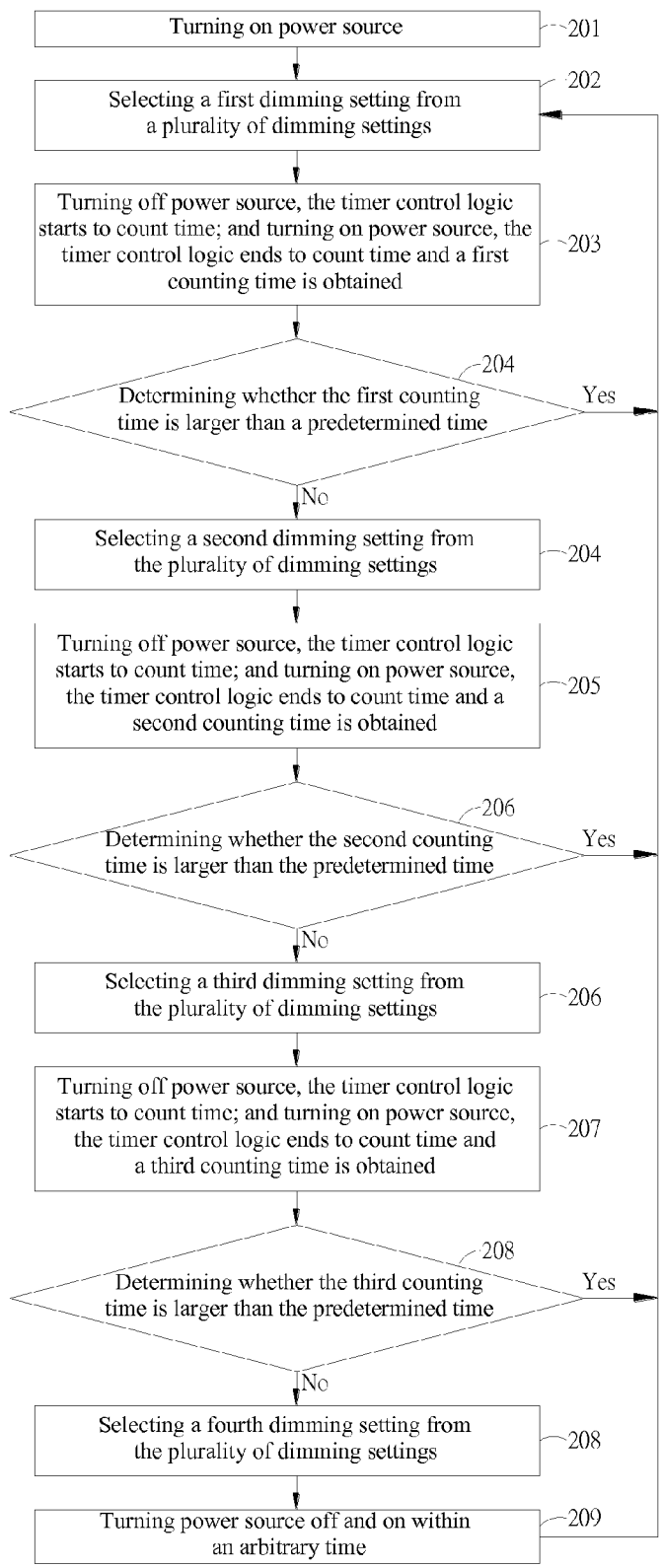
FIG. 2 is a schematic diagram of an embodiment of a timing logic of dimming method using a light emitting diode driving system with precise timing switched dimming control of the present invention.

Please refer to FIG. 2 which is a schematic diagram of an embodiment of a timing logic of dimming method using a light emitting diode driving system with precise timing switched dimming control of the present invention. Now the dimming method will be explicitly explained according to a schematic diagram of an embodiment of a timing logic of dimming method using a light emitting diode driving system with precise timing switched dimming control of the present invention of FIG. 2, the dimming method may include the following steps:

In step 201, turning on the power source;

In step 202, selecting a first dimming setting from the plurality of dimming settings;

In step 203, turning off the power source, the timer control logic starting to time; and turning on the power source, the timer control logic ending to time and a first timing time being obtained;

In step 204, determining whether the first timing time is larger than the predetermined time; if yes, resetting as the first dimming setting, if not, selecting a second dimming setting from the plurality of dimming settings;

In step 205, turning off the power source, the timer control logic starting to time; and turning on the power source, the timer control logic ending to time and a second timing time being obtained;

In step 206, determining whether the second timing time is larger than the predetermined time; if yes, resetting as the first dimming setting, if not, selecting a third dimming setting from the plurality of dimming settings;

In step 207, turning off the power source, the timer control logic starting to count time; and turning on the power source, the timer control logic ending to count time and a third timing time being obtained;

In step 208, determining whether the third timing time is larger than the predetermined time; if yes, resetting as the first dimming setting, if not, selecting a fourth dimming setting from the plurality of dimming settings; and In step 209, turning power source off and on within arbitrary time, resetting as the first dimming setting and repeating the preceding step 202 to step 209.

Wherein, more specifically, the predetermined time may be 3 seconds, the first to the fourth dimming settings respectively indicate that the brightness of the LED light emitting elements 70 may be 100%, 50%, 25% and 1%, individually. What has to be explained is that the first to fourth dimming settings and the predetermined time are only served as examples, and the dimming method used according to the LED driving system 1 with precise timing switched dimming control of the present invention is not limited by only four dimming settings in dimming setting, it may increase or decrease the amount of dimming setting and control the duration of the predetermined time according to need, and conduct extra timing according to the amount of dinning setting to obtain the desired timing, and determine whether the increasing timing is higher than the predetermined time according to the increasing amount of the increasing timing. The setting of the predetermined time, however, has to precisely control the level of power consumption of the timer control logic 20 and the power maintenance capacitor 90, so that the LED driving system with precise timing switched dimming control 1 may at least operate by the setting predetermined time. The following will further explain another dimming method of the embodiment of the LED driving system with precise timing switched dimming control.

Figure 3:
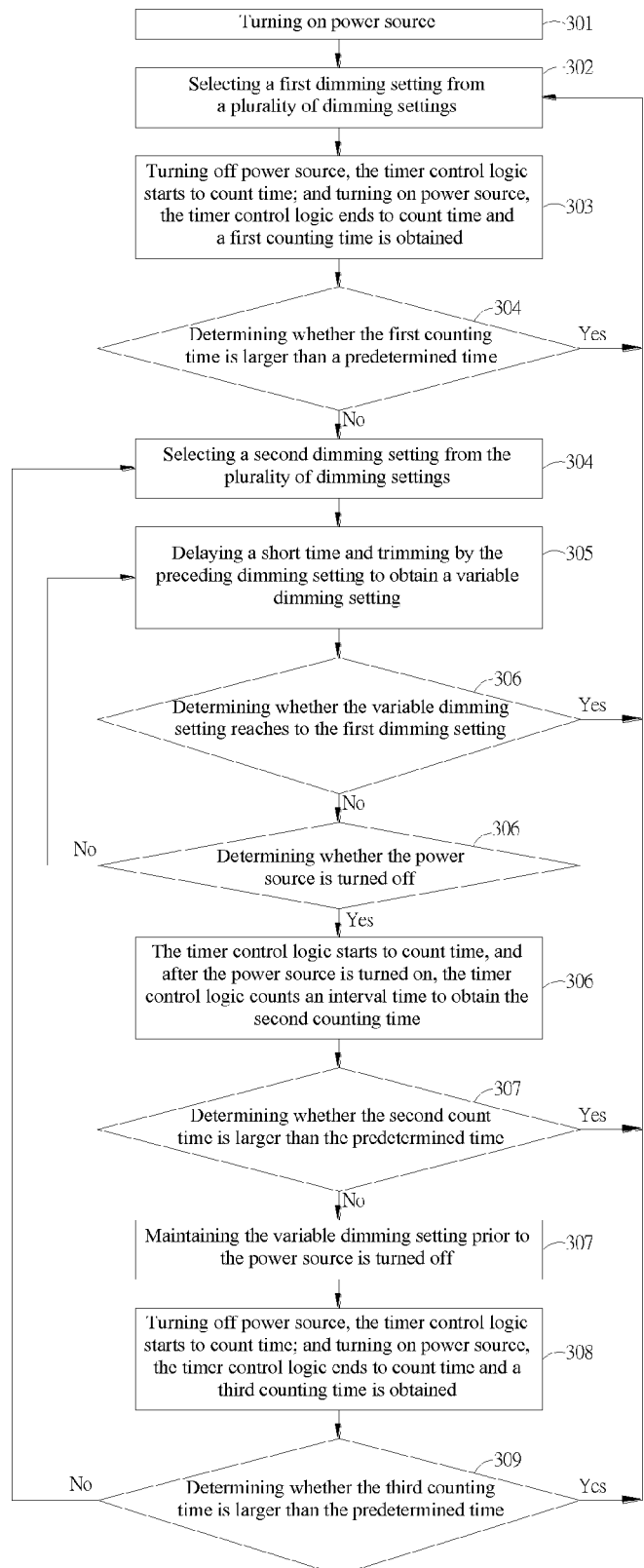
FIG. 3 is a schematic diagram of an embodiment of a timing logic of another dimming method using a light emitting diode driving system with precise timing switched dimming control of the present invention.

Please refer to FIG. 3 which is a schematic diagram of an embodiment of a timing logic of another dimming method using a light emitting diode driving system with precise timing switched dimming control of the present invention. Now the dimming method will be explicitly explained according to a schematic diagram of an embodiment of a timing logic of dimming method using a light emitting diode driving system with precise timing switched dimming control of the present invention of FIG. 3, the dimming method may include the following steps:

In step 301, turning on the power source;

In step 302, selecting a first dimming setting from the plurality of dimming settings;

In step 303, turning off the power source, the timer control logic starting to count time; and turning on the power source, the timer control logic ending to count time and a first timing time being obtained;

In step 304, determining whether the first timing time is larger than the predetermined time; if yes, resetting as the first dimming setting, if not, selecting a second dimming setting from the plurality of dimming settings;

In step 305, delaying a short time continuously and trimming by the preceding dimming setting to obtain a variable dimming setting;

In step 306, determining whether the variable dimming setting reaches to the first dimming setting; if yes, setting as the first dimming setting; if no, determining whether the power source is turned off, if the power source is not turned off, returning to step 305, if the power source is turned off, starting to count time, and after the power source is turned on, the timer control logic counting the interval time to obtain the second timing time;

In step 307, determining whether the second timing time is larger than the predetermined time; if yes, resetting as the first dimming setting, if not, maintaining the variable dimming setting prior to the power source is turned off;

In step 308, turning off the power source, the timer control logic starting to count time; and turning on the power source, the timer control logic ending to count time and a third timing time being obtained;

In step 309, determining whether the third timing time is larger than the predetermined time; if yes, resetting as the first dimming setting, if not, selecting the second dimming setting from the plurality of dimming settings, and repeating the step 305 to step 309.

Wherein, more specifically, the predetermined time is 3 seconds, and the delayed short time is 24 ms, the first and second dimming settings respectively indicate that the brightness of the LED light emitting elements 70 is 100% and 1%, individually, and the third dimming setting trimming means that the brightness of the LED light emitting elements 70 is promoted to 0.5%. Consequently, it may obtain that another dimming method using a light emitting diode driving system with precise timing switched dimming control of the present invention is linear step dimming mode which may satisfy with the shortcomings of the current dimming method. In step 306, the user may maintain the dimming setting in the desired brightness of the LED light emitting elements 70 according to the desired dimming brightness so as to further accomplish the dimming method of variable modes. What has to be described is that the aforementioned first to third dimming settings and the predetermined time are only served as examples, and according to the dimming method using a light emitting diode driving system with precise timing switched dimming control of the present invention, the brightness is not limited in the linear step dimming, it may remove the first dimming setting, trim the brightness more precisely, delay a shorter time, or vary the dimming mode based on the user's need, and it may control the duration of the predetermined time and conduct extra time counting according to the amount of the dimming setting to obtain the desired timing, and determine whether the increasing time is larger than the predetermined time according to the increasing amount of the increasing timing. The setting of the predetermined time, however, has to precisely control the level of power consumption of the timer control logic 20 and the power maintenance capacitor 90, so that the LED driving system with precise timing switched dimming control 1 may at least operate by the setting predetermined time.

In accordance with aforementioned description, the present invention provides a light emitting diode driving system with precise timing control dimming control used for driving light emitting diode elements and dimming method using the same which may design the stable operating status, precise timer dimming according to different situations of diverse power source, switch leakage and system elements to solve the problems concerning that it cannot conduct precise timing in power-off condition, resulting each independent system not be able to synchronize and provides various dimming modes for the user by a timer control logic simultaneously.

Obviously, the present invention has made a breakthrough and definitely accomplished the desired improved effect which is not easily to think of by a skilled person in the art; moreover, the present invention has not been published prior to the file of the patent application, and the inventiveness, practicability thereof both conform with the patentability, and the patent application is hereby provided in accordance with the regulations.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A light emitting diode driving system with precise timing switched dimming control used for driving light emitting diode elements, comprising:
   a power detection unit electrically connected to a rectification unit, the rectification unit receiving an AC voltage and rectifying that as a DC voltage, the power detection unit detecting a voltage frequency of the DC voltage and the AC voltage supplied to a light emitting diode driving circuit;
   a timer control logic comprising an oscillator having a body oscillation frequency, a volatility memory module, and a recovery register; the volatility memory module storing recorded dimming data and a plurality of dimming setting values, the timer control logic obtaining a count value by sampling the voltage frequency of power source with the body oscillation frequency and storing the count value into the recovery register, the timer control logic serving as an oscillation number of the body oscillation frequency by the count value stored in the recovery register after the power source being cut for recovering the voltage frequency and serving as a reference period; wherein the reference period provides the timer control logic serving as a calculation standard of a predetermined time and a timing after the power source is cut, the timer control logic selects one of the plurality of dimming setting values according to the timing and the predetermined time to output a control signal corresponding to the dimming setting value;
   a light emitting diode dimming driver electrically connected to the power detection unit, the light emitting diode driving circuit and the timer control logic, respectively; the light emitting diode driving circuit receiving the DC voltage of the rectification unit and electrically connected to the light emitting diode light emitting elements and output the control signal according to the timer control logic to drive the light emitting diode to emit light, and detecting a feedback signal in the light emitting diode driving circuit to control an output current of the light emitting diode driving circuit so as to control the dimming; and
   a power supply unit electrically connected to the light emitting diode dimming driver, the power supply unit connected to a power maintenance capacitor through a switch unit, the power maintenance capacitor supplying desired power voltage to the timer control logic and the power detection unit in the light emitting diode driving system in power-off condition and comprising at least an electric capacity maintaining the light emitting diode driving system operated by the predetermined time.

2. The light emitting diode driving system with precise timing switched dimming control used for driving emitting diode elements of claim 1, the body oscillation frequency being improved by Laser trimming, and the light emitting driving system take the body oscillation frequency as a main frequency of switching power for dimming control.

3. The light emitting diode driving system with precise timing switched dimming control used for driving emitting diode elements of claim 1, the timer control logic comprising a micro control unit, and the micro control unit at least maintaining operation by the predetermined time by the power maintenance capacitor in power-off condition.

4. The light emitting diode driving system with precise timing switched dimming control used for driving emitting diode elements of claim 1, the timer control logic driving the light emitting diode driving system by the frequency period of the rectified power source serving as the standard time of timer function in power-on condition.

5. The light emitting diode driving system with precise timing switched dimming control used for driving emitting diode elements of claim 1, the light emitting diode dimming driver controlling the light emitting diode elements by a light emitting diode current having peak current control, average current method or zero cross control, and the light emitting diode dimming driver further comprising a power factor correcting circuit for providing power factor correction of a digifax function to ensure the dimming module in stable operation so as to enhance efficiency of the whole circuit while driving the light emitting diode light emitting elements.

6. The light emitting diode driving system with precise timing switched dimming control used for driving emitting diode elements of claim 1, the light emitting diode dimming driver further conducting high color temperature brightness control according to the control signal output by the timer control logic and cooperating with fixed lower color temperature brightness so as to accomplish to control adjustment of color temperature.

7. A dimming method applicable to the light emitting diode driving system with precise timing switched dimming control used for driving emitting diode elements, comprising the following steps:
   turning on a power source; selecting a first dimming setting from a plurality of dimming settings; turning off the power source, a timer control logic starting to count time;
   turning on the power source, the timer control logic ending to count time and a first timing time being obtained;
   determining whether a first timing time is larger than a predetermined time; if yes, resetting as the first dimming setting, if not, selecting a second dimming setting from the plurality of dimming settings;
   turning off the power source, the timer control logic starting to count time;
   turning on the power source, the timer control logic ending to count time and a second timing time being obtained;
   determining whether the second timing time is larger than the predetermined time; if yes, resetting as the first dimming setting, if not, selecting a third dimming setting from the plurality of dimming settings;
   turning off the power source, the timer control logic starting to count time;
   turning on the power source, the timer control logic ending to count time and a third timing time being obtained;
   determining whether the third timing time is larger than the predetermined time; if yes, resetting as the first dimming setting, if not, selecting a fourth dimming setting from the plurality of dimming settings; and
   turning power source off and on within arbitrary time, resetting as the first dimming setting and repeating the preceding steps.

8. A dimming method applicable to the light emitting diode driving system with precise timing switched dimming control used for driving emitting diode elements, comprising the following steps:
   turning on a power source;

selecting a first dimming setting from a plurality of dimming settings; turning off the power source, a timer control logic starting to count time;
turning on the power source, the timer control logic ending to count time and a first timing time being obtained;
determining whether the first timing time is larger than a predetermined time;
if yes, resetting as the first dimming setting, if not, selecting a second dimming setting from the plurality of dimming settings;
setting the second dimming setting as an initial, delaying a short time continuously and trimming by a third dimming setting to obtain a variable dimming setting;
determining whether a variable dimming setting reaches to the first dimming setting; if yes, maintaining the variable dimming setting as the first dimming setting and stopping to trim; wherein, in the present step, if power source is turned off and is turned on after an interval time, the timer control logic counts the interval time to obtain a second timing time and determining whether the second timing time is larger than the predetermined time; if yes, resetting as the first dimming setting, if not, maintaining the variable dimming setting prior to power source being turned off;
turning off the power source, the timer control logic starting to count time;
turning on the power source, the timer control logic ending to count time and a third timing time being obtained;
determining whether the first timing time is larger than the predetermined time; if yes, resetting as the first dimming setting, if not, selecting the second dimming setting from the plurality of dimming settings, and repeating and trimming the continuously delaying short time to obtain the steps of the variable dimming setting.

* * * * *